Sept. 23, 1958     E. R. WILLIAMS     2,853,101
ADJUSTABLE SEAT TANDEM VALVE
Filed Jan. 30, 1957
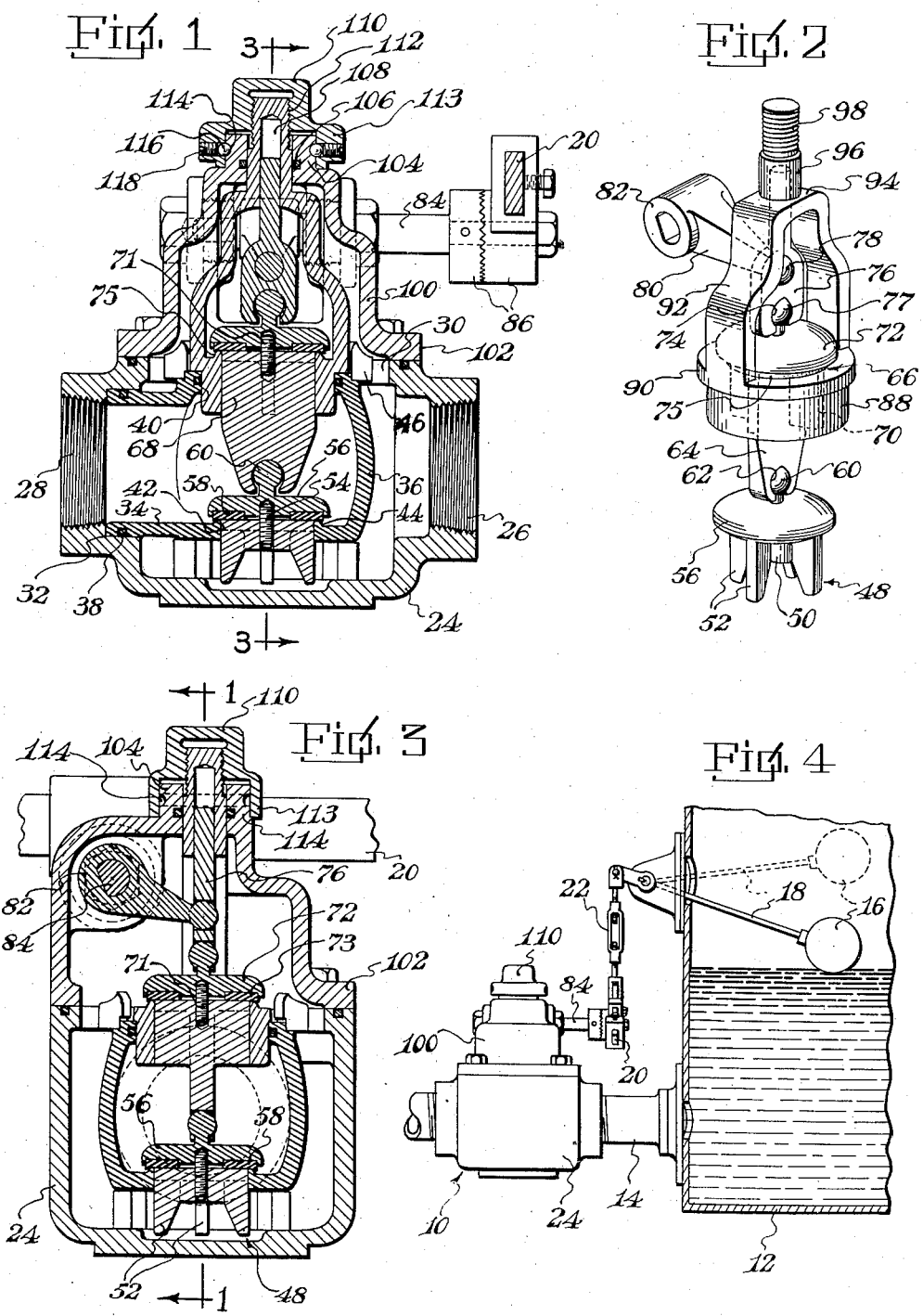

United States Patent Office 2,853,101
Patented Sept. 23, 1958

2,853,101

ADJUSTABLE SEAT TANDEM VALVE

Elmer R. Williams, Tulsa, Okla.

Application January 30, 1957, Serial No. 637,323

6 Claims. (Cl. 137—625.34)

The invention appertains to improvements in valve assemblies and particularly relates to an improved adjustment and seating assembly for a tandem valve unit.

A primary object of the present invention is to provide means for connecting a pair of valve bodies in vertical spaced alignment, such means permitting relative universal movement of the valve bodies while securely connecting them together for common vertical movement relative to their vertically spaced seats.

Another important object of the present invention is to provide a vertically adjustable seat for one of the valve bodies, the seat being adjustable by means disposed exteriorly of the valve housing and being adjustable to ensure perfect seating of both valve bodies.

Another important object of the present invention is to provide means for vertically adjusting the adjustable seat, such means being disposed outside of the valve housing and having locking means to ensure against accidental misadjustment of the adjustable seat.

A still further important object of this invention is to provide a valve body which is formed with a sealing and guiding means, the valve body including a lower vaned body portion and a head which are studded together with a resilient disc, that contacts the valve seat, interposed therebetween.

Generally stated, the present invention includes a cage which is interposed in a valve housing between the intake and exhaust ends thereof and which has vertically aligned upper and lower openings, the lower opening constituting a valve seat for the lower valve. The tandem valve unit includes an upper valve body which is rotatably suspended from a link that is connected to a suitable actuating means and a lower valve body which is rotatably suspended from the upper valve body. The lower valve body contacts the lower valve seat by means of its resilient disc while a vertically adjustable seat unit is provided for the upper valve body. The adjustable seat unit is slidably disposed through the lower opening in the cage and the link extends upwardly therein. The adjustable seat unit is enclosed by a hood that is fixed on the pipe connection and has a threaded upper end. A threaded adjustment member threadingly receives the upper end and is rotatable on the hood. The adjustment member is provided with locking means to lock it against accidental rotation.

The foregoing and ancillary objects, including the provision of a simple, compact and inexpensive tandem valve unit, are attained by this invention, the preferred embodiment of which is set forth in the following description and illustrated in the attached drawing, wherein:

Fig. 1 is a vertical sectional view through the valve unit with parts thereof shown in section and parts in elevation and is taken on the line 1—1 of Fig. 3;

Fig. 2 is a view in perspective of the tandem valve unit removed from its housing;

Fig. 3 is a vertical sectional view taken on line 3—3 of Fig. 1, and,

Fig. 4 is a front elevational of the valve unit showing the same in use in one exemplary environment.

Referring now more particularly to the drawing and initially to Fig. 4 thereof wherein the tandem valve unit 10 is shown in one exemplary environment, the numeral 12 designates a vessel or tank in which a liquid is stored. An outlet pipe 14 is connected to one side of the tank and the valve unit 10 is connected to such outlet pipe to control the flow of the liquid from the tank. Any suitable valve actuating means, responsive to the quantity of liquid in the tank, may be employed. For example, a float 16 is mounted in the tank and has its arm 18 connected to a control lever 20 through a suitable adjustable linkage 22. Thus, the control lever is swung vertically upwardly and downwardly in varying response to the amount of liquid in the tank. The control lever seats and unseats the valve bodies of the tandem valve unit to control the flow of the fluid from the tank.

The tandem valve unit 10 includes a tubular valve housing 24 which has internally threaded inlet and outlet ends 26 and 28 and an opening 30 in its top wall. Inwardly of the outlet end 28, a shoulder 32 is formed to seat the open end of a tubular cage 34 that is axially disposed within the housing 24. The cage has a closed inner end 36, which is transversely interposed in the housing, and has a bottom wall that is spaced above the bottom wall of the housing. An O ring seal 38 is fitted in the outer wall of the cage adjacent the outer end and contacts the adjoining inner wall of the housing to provide a fluid tight seal.

The cage is formed in its spaced top and bottom walls with vertically aligned upper and lower openings 40 and 42. The lower opening 42 has an upstanding rim 44 concentric thereto and forming a valve seat. The bounding wall of the upper opening 40 is provided with an O ring seal. The cage is fixed in place by locking wedges 46.

A lower valve body 48 is composed of a lower cylindrical body portion 50 which has circumferentially spaced, radially outstanding guide vanes 52 formed thereon and extending axially beyond the lower end thereof. The body portion has a threaded axially disposed central bore in which a stud 54 is threaded. The stud connects a head 56 onto the upper end of the body portion, the head radially overhanging the periphery of the body portion. A resilient disc 58 is compressingly clamped between the body portion and the head and extends over the underface of the overhanging peripheral edge of the head to sealingly contact the seat 44. A ball 60 upstands from the center of the head and is rotatably socketed in a spherical socket 62 formed on the lower end of a depending connecting arm 64 on the upper valve body 66.

The upper valve body 66 includes a body portion 68 which has radial guide vanes 70 and which has a head 72 studded on its upper end by a stud 71. A resilient disc 73 is clamped between the body portion 68 and the head and sealingly contacts the seat 75 for the valve body 66. A ball 77 upstands from the center of the head 72 and is universally socketed in a socket 74 formed on the lower end of a connecting link 76. The link 76 has the inner ball end 78 of a crank 80 universally socketed in a suitable socket opening formed transversely therethrough and the sleeve end 82 of the crank is secured on a bell crank shaft 84. Preferably, the shaft 84 and sleeve 82 have engaging flat sides which mate to mount the parts together and prevent relative rotation therebetween. The shaft 84 is connected by interengaging toothed collars 86 to the control lever 20.

Thus, any vertical swinging movement of the control lever 20, caused by movement of the float 16, produces a rotational movement of the bell crank shaft 84 and a resultant vertical swinging movement of the bell crank 80.

The bell crank 80, due to the ball and socket connection with the link 76, causes the link to move vertically in a guided rectilinear path and the link unseats and seats the valve bodies 48 and 66, the bodies moving simultaneously due to the structural interconnection.

The seat 75 for the upper valve body 66 is defined by an upstanding annular rim on a sleeve 88 which slides in the upper opening 40 in the cage. A peripheral shoulder 90 radially outstands from the upper end of the sleeve 88 and constitutes a stop and abuts the upper wall of the cage around the opening 40.

A yoke 92 upstands from the sleeve and the web portion 94 of the yoke has an upstanding lug 96 rigidly formed thereon, the lug terminating in a threaded upper end 98.

A hood or cover 100 encloses the yoke and closes off the opening in the top wall of the housing, the hood having a mounting flange 102 provided on its lower end. The flange 102 is bolted onto the housing with suitable fluid sealing means between the parts. The hood terminates in a cylindrical upper end portion 104 within which the lug 96 vertically slides with an O ring 106 carried by the inner wall of the end portion 104. The lug is formed with a non-circular axial bore 108 within which the upper guide end of the link is slidably disposed so as to prevent rotation of the yoke.

An adjustment head 110 is provided with a threaded bore 112 which receives the threaded end 98 of the lug. The head 110 is rotatably circumposed on the upper end portion 104 of the hood and has a skirt portion 112 that rotates on the upper end portion. It can be seen that rotation of the adjustment head will raise or lower the sleeve 88 and the associated seat 86 while, at the same time, adjusting the lower valve body relative to its seat. Thus, as the seats or resilient discs wear, the adjustment head can be rotated, by hand or by any suitable tool from a position outside of the valve housing, i. e. without removing the hood or exposing the interior of the valve unit, so as to compensate for the wear.

The upper end portion 104 has a circumferential groove 114 formed in its outer surface and in which steel balls 116 are disposed, the balls being positioned in the inner ends of diametrically opposed radial bores in the skirt portion. Set screws 118 are threaded in such bores to lock the balls in the groove. The adjustment head is locked in any desired position of valve adjustment by tightening the set screws and when the set screws are loosened, the head is free to rotate.

It is to be noted that the liquid pressure is exerted underneath the lower valve body tending to unseat it while it is exerted on the top of the upper valve body tending to seat it; thereby creating a perfect balance.

While the best known form of my invention has been illustrated and described herein, other forms may be realized, as come within the scope and spirit of the appended claims.

Having thus described this invention, what is claimed is:

1. A tandem valve unit comprising a valve housing, a pair of aligned valve bodies disposed in end to end relationship, means connecting the valve bodies for simultaneous axial movement, a stationary seat for one valve body, an adjustable seat for the other valve body, means moving said adjustable seat in a direction along the axis of the valve bodies and means connected to one of the valve bodies for simultaneously seating and unseating the valve bodies, said means for moving said adjustable seat including a connection extending from the seat, a threaded member carried by said connection and a rotatable adjustment head rotatably and sealingly mounted on the housing and having a threaded bore receiving the threaded member and means preventing rotation of the connection so that rotation of the adjustment head will cause the connection to move axially.

2. A tandem valve unit as claimed in claim 1, wherein said adjustment head and housing are provided with cooperating locking means to lock the adjustment head against rotation.

3. A tandem valve unit for use in controlling the flow of a fluid comprising a housing having an inlet and an outlet, and a top wall formed with an opening, a cage disposed in the housing and having an upper and lower wall formed with vertically aligned openings to communicate the inlet with the outlet, means communicating the openings with the inlet, said lower wall having a valve seat formed around the opening, a valve body slidably disposed in the opening to seat on the seat, a sleeve slidably mounted in the opening in the upper wall and constituting a valve seat, an upper valve body slidable in the sleeve and adapted to seat on the valve seat in the sleeve, universal coupling means connecting the valve body, a hood enclosing the sleeve and closing off the opening in the top wall of the housing, a link universally connected to the upper valve body, actuating means for moving the link vertically to seat and unseat the valve bodies, and means for moving the sleeve vertically to adjust the valve seat relative to the valve bodies.

4. A tandem valve unit as claimed in claim 3, wherein said last means includes a yoke upstanding from the sleeve, a threaded stud upstanding from the yoke, means rotatably mounted on the hood threadingly engaged with the stud to raise and lower the yoke and sleeve and guide means provided between the yoke and the link to prevent rotation of the yoke.

5. A tandem valve unit as claimed in claim 4, wherein said means rotatably mounted on the hood includes an adjustment head having a threaded axial bore receiving the threaded stud.

6. A tandem valve unit as claimed in claim 5, wherein said hood has an upper cylindrical portion on which the adjustment head rotates, said cylindrical portion having a circumferential groove in its outer wall, said adjustment cap having a skirt portion rotatably bearing on the cylindrical portion and having radial bores, balls socketed in the inner ends of the bores and riding in the groove as the adjustment head is rotated and set screws threaded in the bores to bind the balls in the groove and lock the adjustment head against rotation.

References Cited in the file of this patent

UNITED STATES PATENTS

| | | |
|---|---|---|
| 186,863 | Meikle | Jan. 30, 1877 |
| 1,484,668 | Partlow | Feb. 26, 1924 |
| 2,019,193 | Mueller | Oct. 29, 1935 |

FOREIGN PATENTS

| | | |
|---|---|---|
| 337,710 | Italy | Mar. 11, 1936 |